April 14, 1964     W. M. SCHWARTZ, JR     3,128,568
STEAM IRON WITH WATER SPRAY
Filed May 19, 1961     3 Sheets-Sheet 1
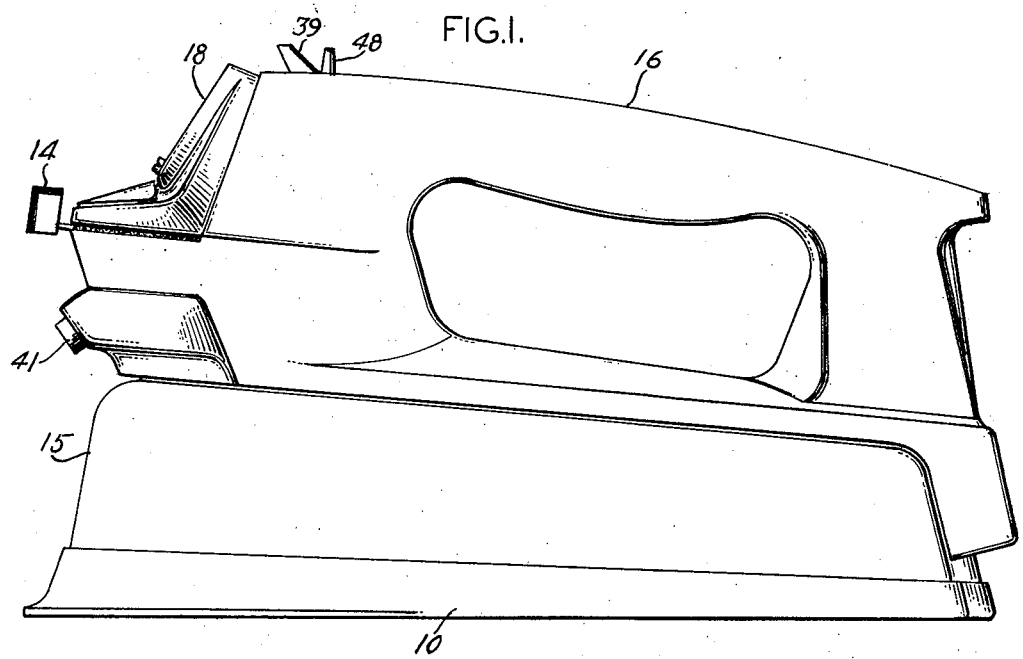
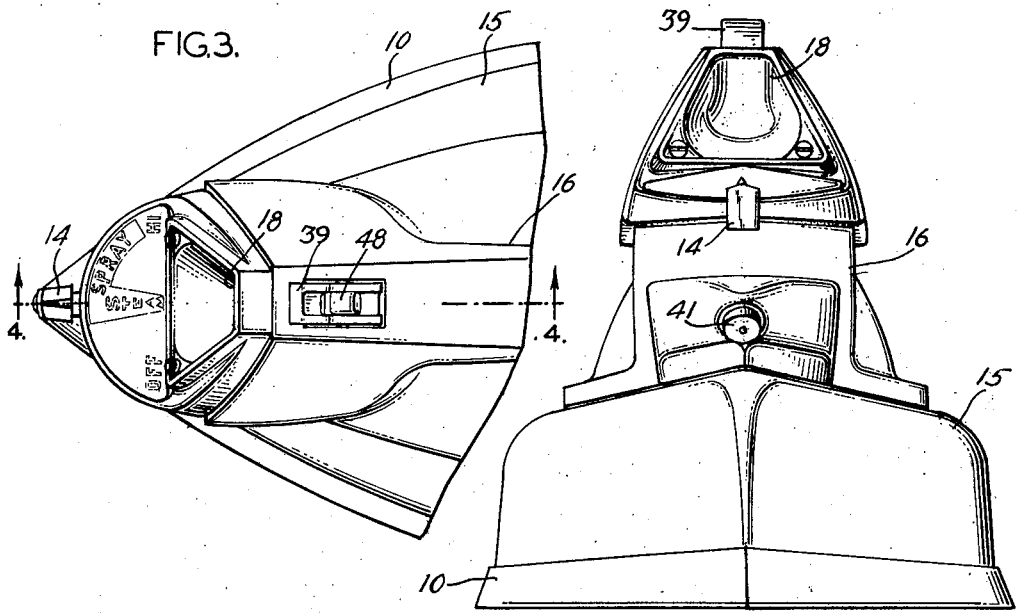
INVENTOR:
WALTER M. SCHWARTZ, JR.
BY Howson & Howson
ATTYS.

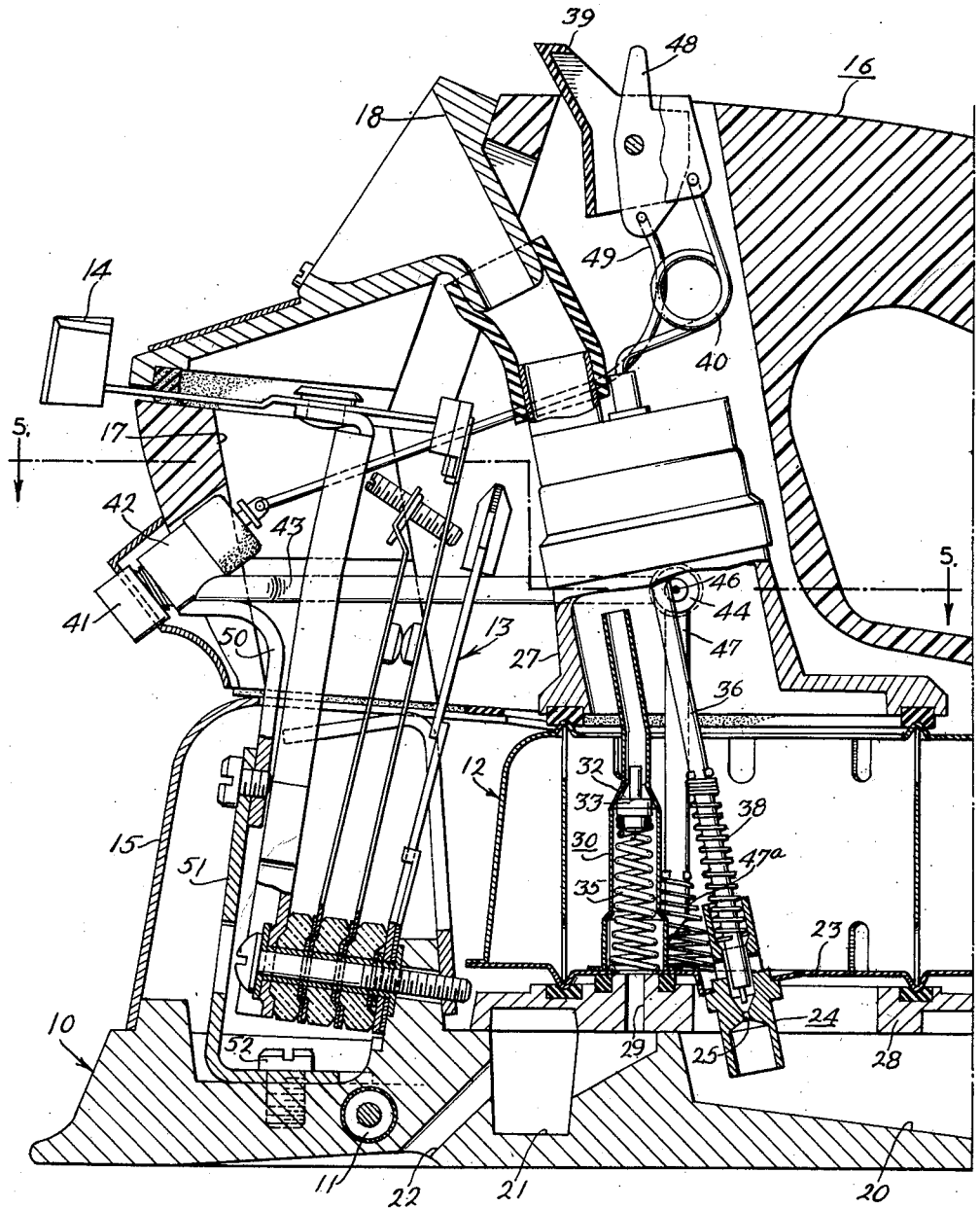

April 14, 1964 W. M. SCHWARTZ, JR 3,128,568
STEAM IRON WITH WATER SPRAY
Filed May 19, 1961 3 Sheets-Sheet 3
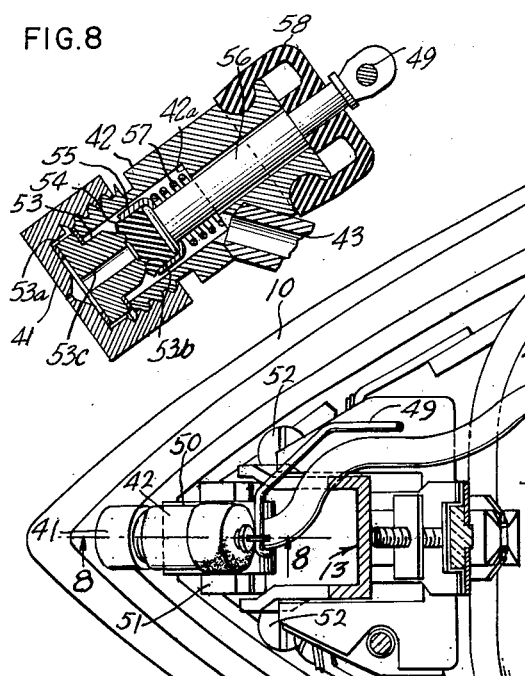
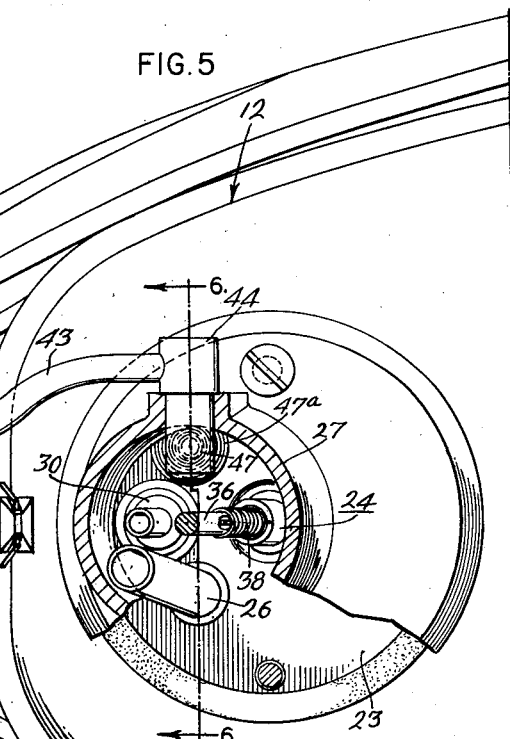
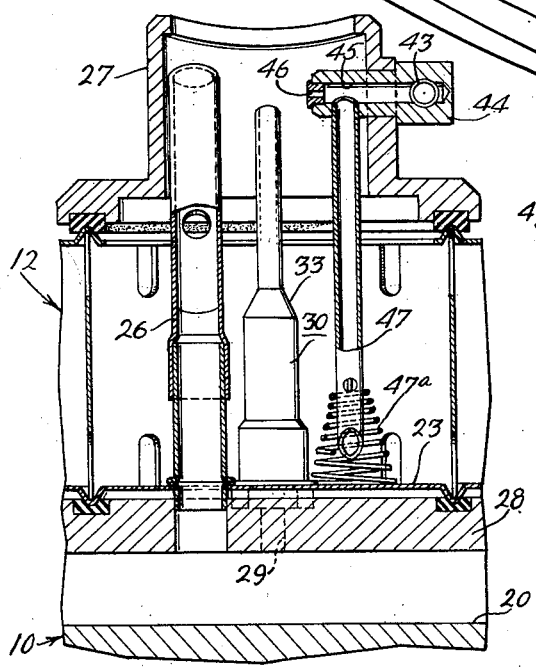
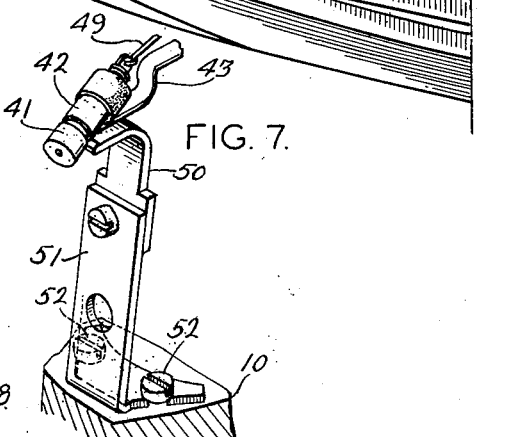
INVENTOR:
WALTER M. SCHWARTZ, JR.
BY Howson & Howson
ATTYS.

United States Patent Office 3,128,568
Patented Apr. 14, 1964

3,128,568
STEAM IRON WITH WATER SPRAY
Walter M. Schwartz, Jr., Philadelphia, Pa., assignor to Proctor Manufacturing Corporation, Rio Piedras, Puerto Rico, a corporation of Delaware
Filed May 19, 1961, Ser. No. 111,259
3 Claims. (Cl. 38—78)

This invention relates to a steam and dampening iron, and more particularly to an electric iron in which steam is utilized to deliver a spray of water to the material to be ironed.

In general, such irons include a spray nozzle located preferably at an elevated position in the forward portion of the iron, arranged to deliver atomized water over a considerable area of the work surface. A water container is provided within the body of the iron, and provision is made for the generation of steam, either by boiling the water in the container or by delivering a controlled feed of water to a steam generating chamber in the heated soleplate.

In some cases, the pressure of the generated steam, acting on the surface of the water in the container, is used to force water through the spray nozzle by means of a conduit extending from a point beneath the surface of the water. Since it is desirable to limit the steam pressure in the iron to a relatively low value, ordinarily this system is not adequate to produce a sufficiently finely divided spray, even when the discharge orifice is quite limited in area. It has therefore been proposed to include means for mixing steam with the discharging water, thereby creating better atomization even when the discharge orifice is of larger size and therefore less liable to be obstructed by solids impurities. In the system just described, this admixture is obtained by using two valves, one controlling the water flow and the other controlling the steam flow.

In other cases, a fluid conductor is arranged above the surface of the water in the container, extending from the spray nozzle to a point in communication with the generated steam. A water conduit is provided having an inlet beneath the surface of the water and having an outlet connected into the fluid conductor intermediate its two ends. In this system, the velocity of steam flow across the upper end of the water conduit draws water upward into the fluid conductor by eductor action and discharges it through the spray nozzle. This arrangement lends itself to a simplified control, comprising a single valve associated with the spray nozzle. When the valve is open, there is a flow of combined steam and water. When the valve is closed, no water is drawn into the fluid conductor since there is no steam flow to lift it from the water container.

One of the drawbacks in the last-named system is that after the valve is closed, the steam present in the fluid conductor tends to condense, since at least a portion of the conductor may be exposed to relatively low ambient temperatures. When such condensation occurs, undesirable spitting of poorly atomized water may be experienced at the time the valve is again opened. In the spray iron of this invention, such condensation is avoided by providing means for maintaining the fluid conductor at an elevated temperature. Conveniently, this may take the form of heat-conductive means which is arranged to connect the fluid conductor or its associated spray nozzle to the soleplate. Since, according to usual practice, an electric heating element is mounted in the soleplate, heat flowing from the soleplate through the heat-conductive means maintains the fluid conductor at a relatively high temperature. This prevents condensation of steam when the valve is in closed position. When the valve is opened, the first discharge through the nozzle consists primarily of super-heated steam instead of condensate, and undesirable spitting is avoided.

The invention may be best understood by reference to the following description taken in conjunction with the accompanying drawings, in which FIG. 1 is a side elevational view of a spray iron embodying the invention;

FIG. 2 is a front elevational view of the iron of FIG. 1;

FIG. 3 is a plan view of the front portion of the iron;

FIG. 4 is a sectional view taken along line 4—4 of FIG. 3;

FIG. 5 is a plan view taken along line 5—5 of FIG. 4;

FIG. 6 is a fragmentary sectional view taken along line 6—6 of FIG. 5;

FIG. 7 is a perspective view of a heat-conductive means connected between the soleplate and the fluid conductor; and FIG. 8 is a sectional view taken along line 8—8 in FIG. 5.

Referring particularly to FIGS. 1 to 4, the illustrated iron comprises a soleplate 10 having embedded therein a heating element 11 of the rod type, a water container or reservoir 12 mounted above the soleplate, an adjustable thermostatic control mechanism 13 extending upwardly from the soleplate including manual adjusting means 14, and a shell 15 serving to enclose the parts immediately above the soleplate, and a handle 16 having a hollow front column 17 adapted to house the upper part of the thermostatic control mechanism, a fill spout 18 for introducing water into the water reservoir, and various control means that will be hereinafter described.

Soleplate 10 includes in its upper surface a steam generating chamber 20 and a second chamber 21, which is in communication with one or more steam emission apertures 22 through the bottom of the soleplate.

Extending through the bottom 23 of water reservoir 12 and affixed thereto is a valve body 24, provided to permit a controlled feed of water from reservoir 12 to steam generating chamber 20 through aperture 25. Also affixed to the bottom 23 is a tube 26 (see FIG. 6) which is in communication with the steam generating chamber and extends upward into a steam dome 27, mounted above the water reservoir and in communication therewith. A cover 28 is arranged above chambers 20 and 21 in such manner as to prevent any direct escape of steam therebetween. An aperture 29 is provided through cover 28, and a pressure-regulating valve assembly 30 is mounted on reservoir bottom 23 in communication with this aperture. The pressure regulator comprises a tubular body having a tapered upper portion 32, and a valve disc 33 biased into engagement with the tapered portion by spring 35.

A regulated feed of water from reservoir 12 to steam generating chamber 20 is made possible by the provision of valve stem 36, being axially movable to open or close orifice 25 in valve body 24, and being biased to open position by means of spring member 38. It is controlled by manually operable toggle member 39 which is pivotally mounted in the upper end of hollow column 17, and which is connected to valve stem 36 by a spring wire member 40.

A spray nozzle 41 is mounted in the forward portion of the iron. As can best be seen in FIG. 4, the nozzle is threadedly attached to nozzle body 42 which is in communication with a fluid conductor 43. The other end of conductor 43 is affixed to member 44, which is secured in turn to steam dome 27. Referring to FIG. 6, member 44 has an internal passageway 45 connecting conductor 43 with the interior of steam dome 27 through a restricted orifice 46. A water conduit 47 has an upper end which opens into passageway 45 and a lower end positioned at a point near the bottom of water reservoir 12. A strainer 47a, shown in the form of a coiled spring, is affixed to the lower end of conduit 47 and engages the bottom of the reservoir.

Mounted inside nozzle body 42 is a valve arranged to open or close communication between fluid conductor 43 and spray nozzle 41. Referring to FIG. 8, the valve comprises a seat 53 having a radially extending flange 53a held by opposed parts of the nozzle 41 and body 42 between which it extends with suitable gaskets to prevent escape of steam or water. Preferably, valve plug 54 is constructed of resilient material adapted to conform to the shape of a circular raised portion 53b on the face of the valve seat to create a tight seal. Valve seat member 53 is provided with a bore 53c which communicates between the interior of the valve body and the spray nozzle when the valve is in open position. Plug 54 is frictionally held in a cup formed by tubular shell 55 and one end of valve stem 56 to which the shell is fixed. A spring 57 to keep the valve in normally closed position extends from shell 55 to an internal shoulder 42a of the valve body. A flexible diaphragm 58 is secured to the valve body and includes a bore which fits closely around a portion of the valve stem. A spring wire 49 is extended from the outer end of valve stem 56 to toggle member 48 (see FIG. 4). When the toggle member is moved to the left the plug 54 is withdrawn from seat member 53 against the bias of spring 57 so that the valve is opened. When the toggle is released, the spring returns the valve to the closed position.

When it is desired to spray water on the material being ironed, toggle member 39 is moved to valve-opening position and water is thereby fed to steam generating chamber 20. The steam rises into steam dome 27 through tube 26. A normally-closed aperture 11, not shown, prevents the steam from escaping through fill spout 18. After a predetermined steam pressure is developed in the upper portion of the water reservoir (e.g., 4 pounds per square inch) further pressure depresses valve disc 33 against the bias of spring 35 and a constant predetermined steam pressure is maintained in the water reservoir while excess steam escapes through aperture 29 into chamber 21 and thence through emission aperture 22 in the soleplate. At this time, toggle 48 may be moved to open-valve position. Steam from steam dome 27 sweeps across the upper end of water conduit 47, the steam flow being of high velocity due to the restricted orific 46 at the inlet point. This lifts water through conduit 47 by eductor action and the water is ejected from nozzle 41 in a finely divided spray. When spraying is to be discontinued, the spray valve is moved to closed position either manually or through a spring bias, effective when toggle 48 is released, as illustrated.

It will be seen from the construction described that fluid conductor 43 is in continuous communication with the interior of the steam dome. When the spray valve is closed, steam may condense in the fluid conductor, since it is in an area of relatively low ambient temperature. This is objectionable for reasons already stated. To avoid this disadvantage, a heat-conductive metallic member 50 is attached to valve body 42, as by welding or brazing. Its other end is affixed to a strap 51 which is firmly attached to soleplate 10 by screws 52 or other convenient means. The general arrangement is clearly shown in FIG. 7. Since heating element 11 maintains the soleplate at an elevated temperature, body 42 and the associated fluid conductor 43 are continuously heated by conduction from the soleplate through strap 51 and member 50 to a temperature above that at which condensation of steam can occur. In the absence of condensate, no spitting of poorly atomized water is experienced when the valve is opened and a finely divided spray is obtained at all times, since the water available for this purpose represents solely the amount drawn up through conduit 47 by the eductor action of the steam flow. This quantity is controlled by the predetermined pressure in the steam dome and the size of steam orifice 46.

In practice, one satisfactory heat-conductive means was made, having member 50 constructed of copper, 0.064" thick, 5/16" wide, and with a free length of approximately 3/4"; and having strip 51 constructed of aluminum, 0.062" thick, 17/32" wide, and with a free length of approximately 1½". In normal operation, with a soleplate temperature of 310° F., the temperature of the fluid conductor was 260° F., while the ambient temperature to which it was exposed averaged 190° F. It was necessary to reduce the soleplate temperature to less than 230° F. before condensation in the fluid conductor could take place, which is below the preferred soleplate temperature for satisfactory steam generation.

The iron described above is merely illustrative. The invention may equally well be applied to a flash-boiler iron in which the steam is delivered to the fluid conductor directly from the steam generating chamber without passing through the water reservoir. It may also be applied to an iron in which the steam generating chamber is omitted, and steam is formed by boiling the water in the water container either through heat transmitted from the soleplate or by means of a separate heating element. Also, separate heating means may be applied directly to the spray nozzle or to the fluid conductor, although the preferred arrangement is to utilize heat from an existing heating element for this purpose, as described. All modifications within the scope of the claims are intended to be within the scope and spirit of the present invention.

I claim:

1. In a spray iron, an outer shell surrounding the lower portion of the iron, a container for water within said shell, an electric resistance heating element arranged to convert the water within said container into steam, eductor means communicating at its inlet end with the water in said container and with the generated steam to deliver a spray of water to the material to be ironed, said eductor means having a control valve positioned at the outlet end thereof, a portion of said eductor means between said container and said control valve extending exteriorly of said container through an area where it is exposed to an ambient temperature low enough to cause condensation of steam in said portion when said control valve is closed, and a heat conductive member separate from said shell and container and in heat-conductive relationship with said heating element and operatively connected to said portion to superheat any water within said portion and to maintain said portion at a temperature above that at which condensation can occur therein.

2. In a spray iron, a soleplate, a heating element in said soleplate, an outer shell surrounding the lower portion of said iron and surmounting said soleplate, a container for water within said shell and mounted above said soleplate, a steam generating chamber in said soleplate, means for delivering water from said container to said steam generating chamber to convert said water into steam, a fluid conductor having its inlet end in communication with said steam generating chamber and having at its outlet end an atomizing discharge outlet for delivering a spray of water to the material to be ironed, said discharge outlet being positioned remote from said steam generating chamber and said container, a portion of said fluid conductor between said container and said atomizing discharge outlet extending through an area where it is exposed to an ambient temperature low enough to cause condensation of steam in said portion, water conducting means communicating with the water in the water container and with said fluid conductor at a point between the inlet end and outlet end of said fluid conductor, a control valve positioned as the outlet end of said fluid conductor to control said atomizing discharge outlet, and a heat conductive member separate from said shell and container and directly connected between and in direct heat-conductive relationship with said soleplate and said fluid conductor to superheat any water within said portion of said fluid conductor and to maintain said portion at a temperature above that at which condensation can occur therein.

3. In a spray iron, a soleplate, a heating element in said soleplate, an outer shell surrounding the lower portion of said iron and surmounting said soleplate, a water reservoir within said shell and mounted above said soleplate, a steam generating chamber in said soleplate, means for delivering water from said reservoir to said steam generating chamber to convert said water into steam, conduit means extending from said steam generating chamber to the space above the surface of the water in said reservoir, a fluid conductor having its inlet end in communication with the steam in the space above the surface of the water in said reservoir and having at its outlet end an atomizing discharge outlet for delivering a spray of water to the material to be ironed, said atomizing discharge outlet being positioned remote from said reservoir, a portion of said fluid conductor between said atomizing discharge outlet and said reservoir extending through an area where it is exposed to an ambient temperature low enough to cause condensation of steam in said portion, water conducting means extending from a point near the bottom of said reservoir communicating with said fluid conductor between its inlet end and its atomizing discharge outlet, a control valve positioned at the outlet end of said fluid conductor to control said atomizing discharge outlet, and a heat conductive member separate from said shell and reservoir and directly connected between and in heat-conductive relationship with said soleplate and said fluid conductor to superheat any water within said portion of said fluid conductor and to maintain said portion at a temperature above that at which condensation can occur therein.

References Cited in the file of this patent

UNITED STATES PATENTS

| | | |
|---|---|---|
| 2,741,044 | Maykemper | Apr. 10, 1956 |
| 2,762,143 | Hoecker | Sept. 11, 1956 |
| 3,041,757 | Swenson et al. | July 3, 1962 |